United States Patent [19]
Prior et al.

[11] Patent Number: 5,806,957
[45] Date of Patent: Sep. 15, 1998

[54] SEALED AUTOMOTIVE EMBLEM LIGHTING ASSEMBLY AND METHOD

[75] Inventors: Donald R. Prior; Michael T. Sweeney, both of St. Louis County, Mo.; Basil V. Gregorovich, New Castle County, Del.

[73] Assignee: Siegel-Robert, Inc., St. Louis, Mo.

[21] Appl. No.: 605,361

[22] Filed: Feb. 22, 1996

[51] Int. Cl.⁶ .............................. F21N 31/02; B60Q 1/00
[52] U.S. Cl. ........................... 362/61; 362/267; 362/310; 362/375
[58] Field of Search .............................. 362/61, 267, 310, 362/307, 80, 311; 264/46.6, 252, 261; 40/556

[56] References Cited

U.S. PATENT DOCUMENTS

| | | | |
|---|---|---|---|
| 4,240,131 | 12/1980 | Albrecht | 362/267 |
| 4,447,862 | 5/1984 | Shanks | 362/267 |
| 4,509,106 | 4/1985 | Mayer et al. | 362/267 |
| 4,860,173 | 8/1989 | Jocher et al. | 362/61 |
| 5,249,104 | 9/1993 | Mizobe | 40/556 |
| 5,560,706 | 10/1996 | Yamazaki et al. | 362/267 |
| 5,562,338 | 10/1996 | Yamamoto | 362/267 |
| 5,651,608 | 7/1997 | Wedell | 362/267 |

*Primary Examiner*—Thomas M. Sember
*Attorney, Agent, or Firm*—Polster, Lieder, Woodruff & Lucchesi

[57] ABSTRACT

Automotive emblem lighting assemblies, and methods of making. One embodiment comprises a bezel mounted to a transparent/translucent lens, with junction therebetween which can be sealed. Viscous curable material is dispensed upon the lens rear and bezel. Bubbles within the viscous material are removed. A housing is bonded with the viscous material and bezel/lens. The curable material is cured and seals the assembly. A light source shines through the lens. The lens can have an emblem shaped recess or recesses. Part of the lens rear can be coated with substantially opaque material. A reflective-transmissive material coats at least part of the lens rear for light transmission/reflection. Diffusion can be by a diffusing agent in the viscous material, reflective surface on the light source, or diffusing material on the lens.

Modifications: lens with no substantially opaque coating, an emblem shaped lens, reflective-transmissive material on the lens rear, and no bezel. The lens and housing can interfit, with the cured material sealing their junction. The lens rear can be curved or even. Another modification: lens and housing do not interfit. Sealer dispensed over the lens perimeter, housing placed thereagainst and viscous curable material dispensed through housing to cover lens to bond to housing. Another embodiment: lens with sealer dispensed about perimeter, viscous curable material dispensed therein, with bonded light source, e.g., LED or electro luminescent pad. The cured material seals to impede contaminants and moisture from the interior, protect lens coatings and enhance visual effects while bonding components.

16 Claims, 5 Drawing Sheets

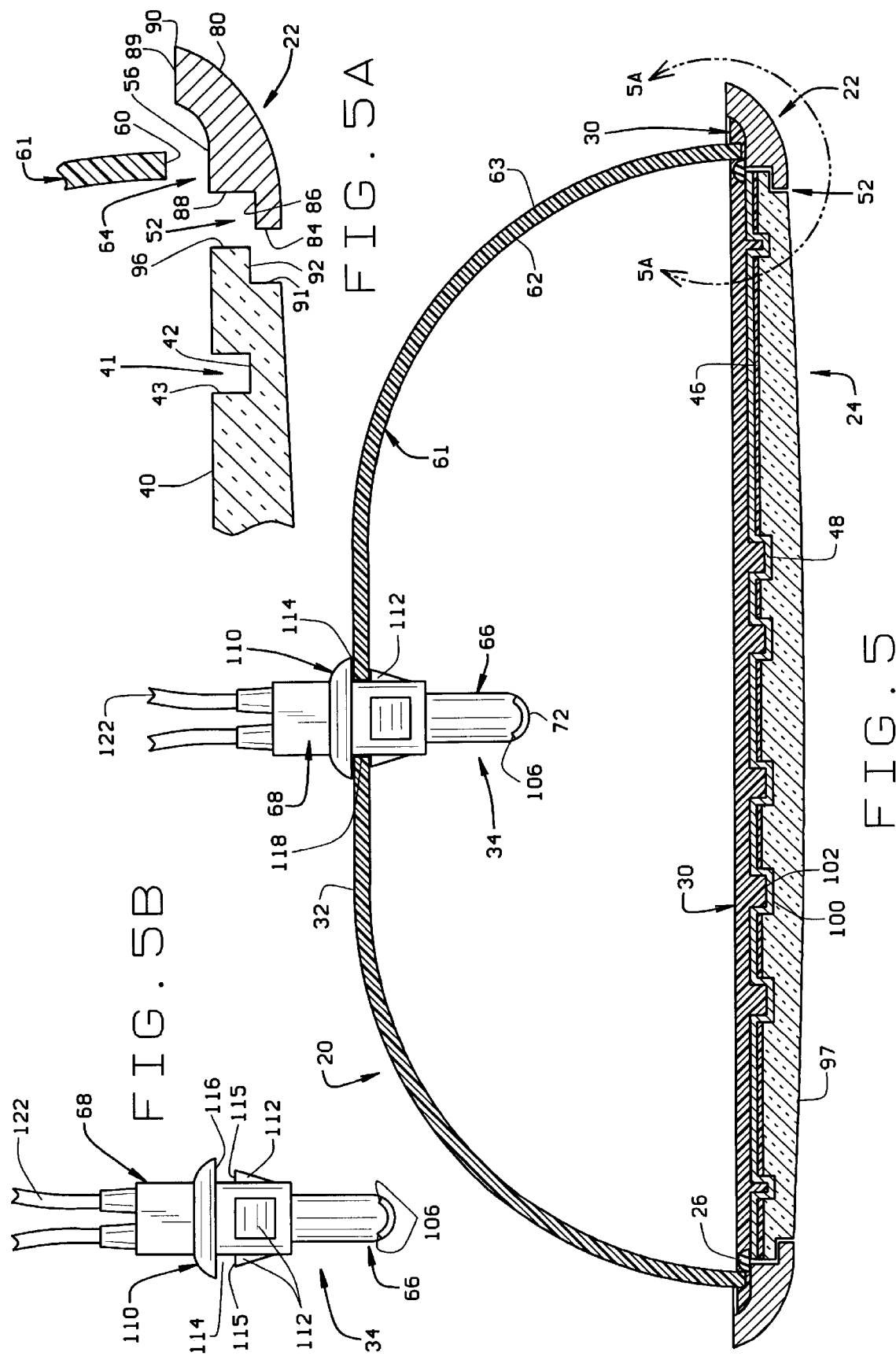

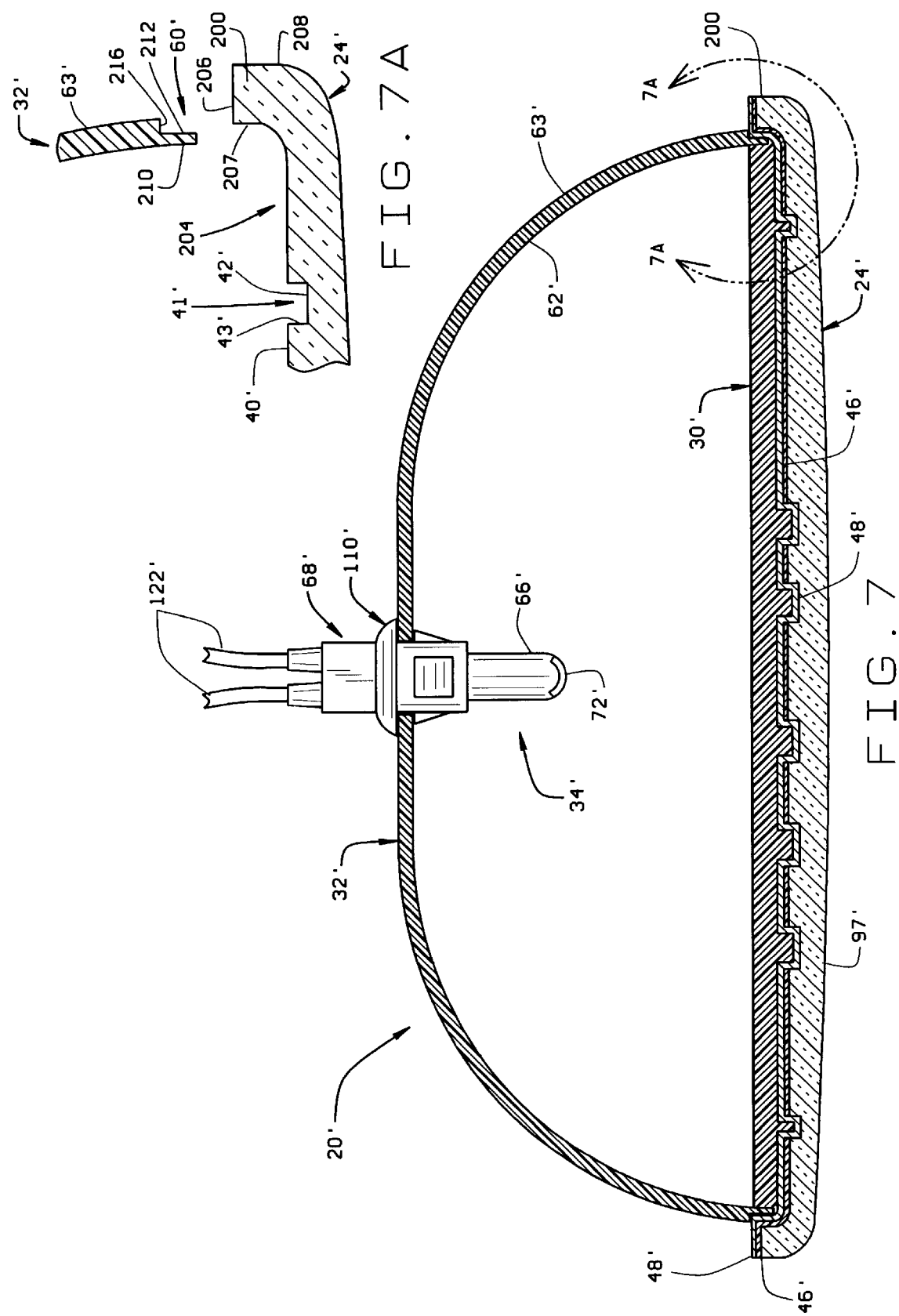

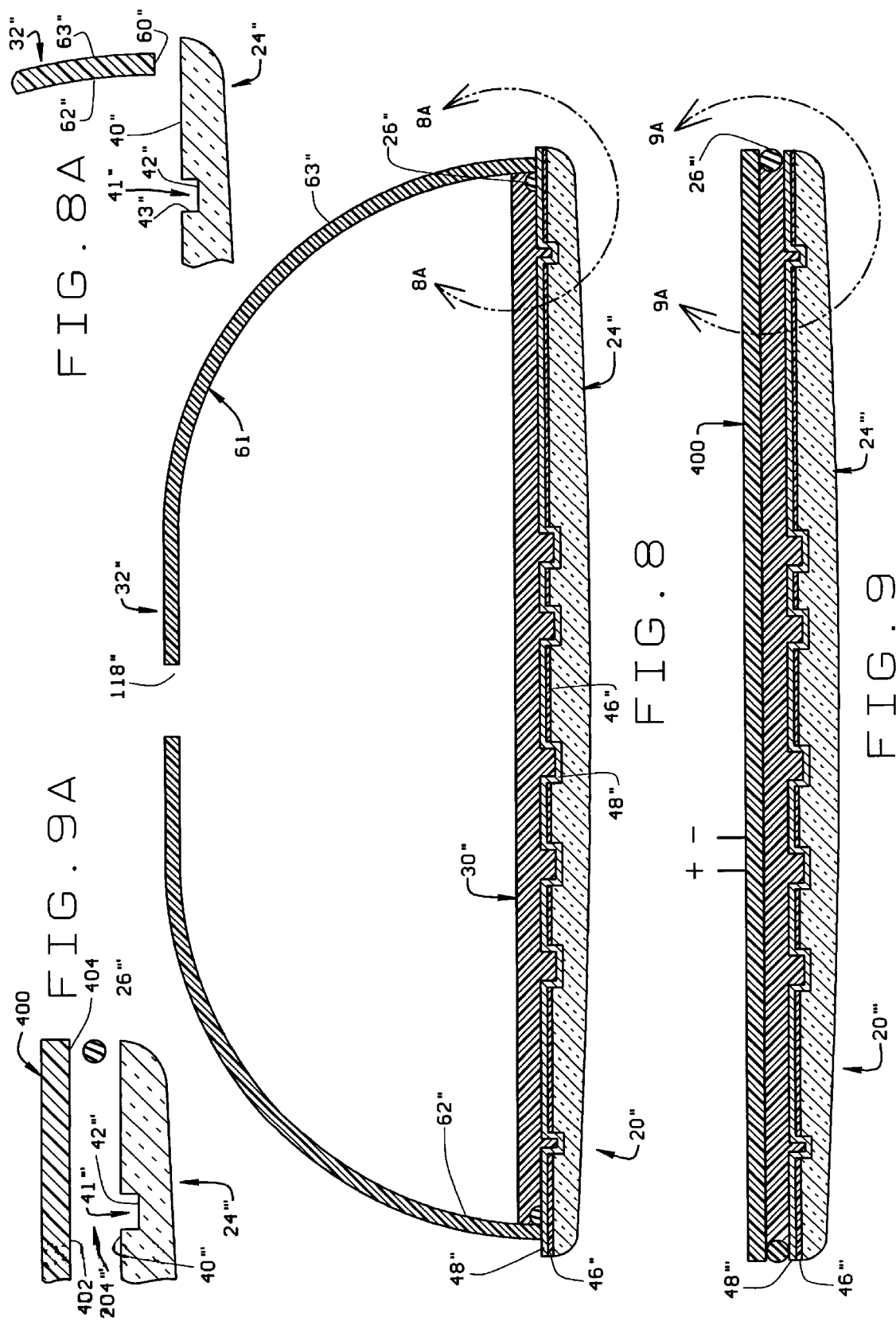

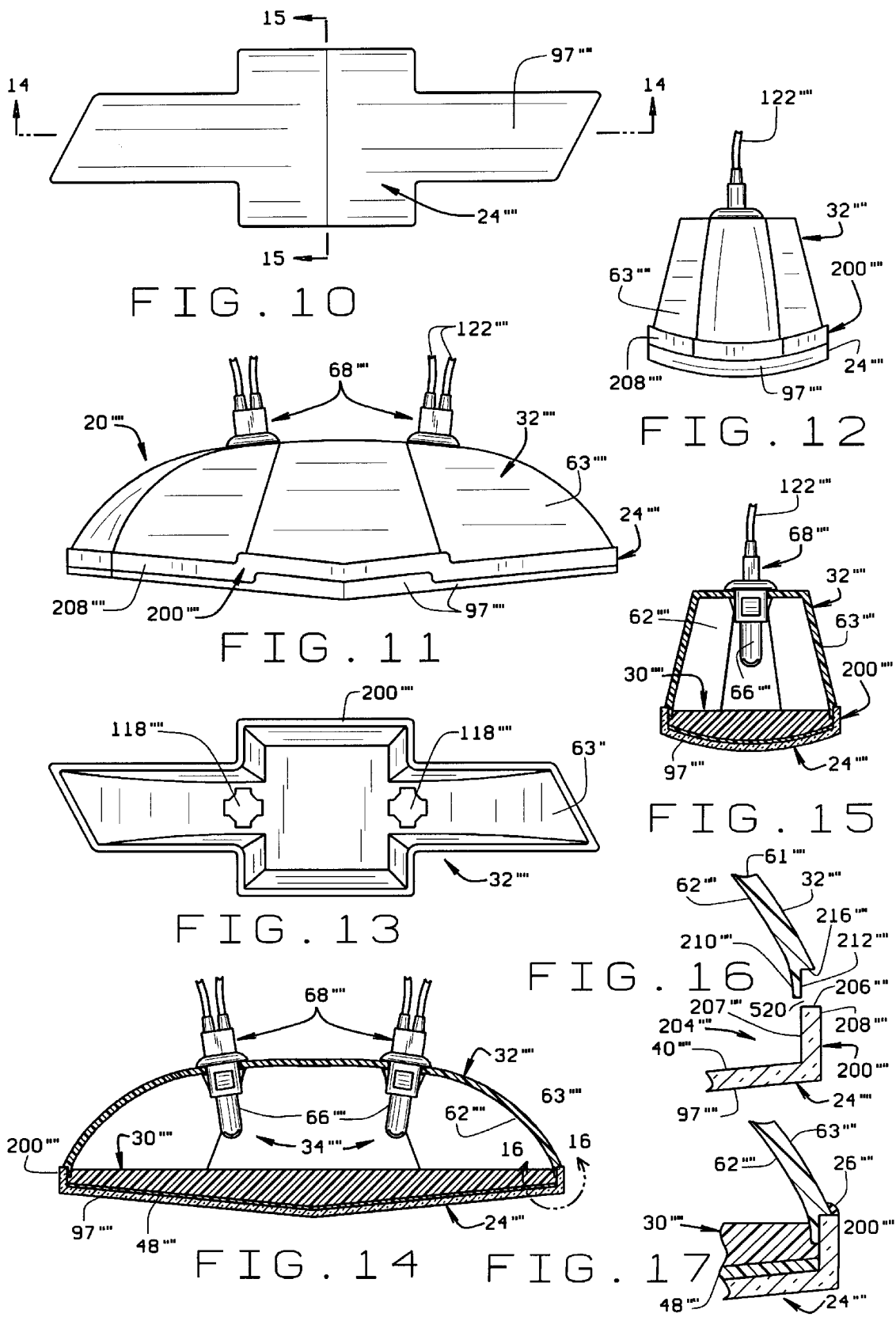

SEALED AUTOMOTIVE EMBLEM LIGHTING ASSEMBLY AND METHOD

BACKGROUND OF THE INVENTION

This invention relates to automotive emblem lighting assemblies, and methods for making automotive emblem lighting assemblies. Emblems are mounted to automobiles to display trademarks of the automobile manufacturer, or for decoration, for example. It is generally desirable that the significant features of the emblems be visible both during daylight and darkness. However, to provide an emblem visible in darkness, it is necessary to light the emblem. In the prior art, automotive emblem assemblies have had lighting located to the rear of the emblem, so that light shining through the emblem makes the emblem image visible to one looking at the front of the emblem. In the prior art, assemblies for lighted emblems have employed a housing, lens and a frame, with screws securing the frame and housing together. Contaminants and moisture threaten such prior art assemblies from effective operation and aesthetic appearance. Such contaminants include salt, dirt, fiber, fuel vapor, antifreeze, hot waxes and cleaners, for example. Moisture in all forms, gas, liquid, or ice, is undesirable within such automotive lighting assemblies. Such contaminants and moisture harm the electrical system, cause discoloring or clouding of the lens or emblem, or cause corrosion or deterioration.

It is therefore desirable to provide a seal to protect the interior of the emblem lighting assembly from such contaminants and moisture that can injure the electrical system, discolor or cloud the lens or emblem, or cause corrosion or deterioration. It would also be advantageous to have an assembly of construction which utilizes the assembly components efficiently and effectively. Moreover it would be beneficial to have an economical and efficient method for making an automotive emblem lighting assembly.

SUMMARY OF INVENTION

The present invention provides advantages over the prior art, and provides protection against problems with such contaminants and moisture. The invention includes a novel automotive emblem lighting assembly, for which different embodiments are disclosed. The invention also includes methods for making automotive emblem lighting assemblies. Generally, one embodiment of the invention comprises a bezel, and a lens comprised of transparent or translucent material. The embodiment is assembled by supporting the lens within the bezel. A junction is formed at the interface of the lens and bezel. In the case of the junction not being tight enough, a bead of sealer material can be dispensed over the rear of the lens-bezel junction to cover it. Thereafter, a layer of viscous curable material is dispensed over the rear side of the lens, over the sealer bead, and over the part of the interior surface of the bezel. The sealer bead prevents the viscous curable material from seeping through the lens-bezel junction to the front side of the lens, in cases where the fit at the junction is not tight enough to prevent such seepage. Gas bubbles within the viscous curable material can then be removed, as by a vacuum chamber. A housing having provisions for a light source is then pressed into the viscous curable material, with the housing's front edge within the bezel, but preferably outside the sealer bead. A junction exists between the housing wall, and the bezel and lens. The assembled components are then subjected to a temperature for a time period that allows curing of the viscous curable material, so that it hardens and seals following curing. After curing, the bonding of the cured material with the lens, sealer, bezel and housing provides a seal to impede the flow of moisture and contaminants (such as previously discussed), from outside of the lens, bezel and housing to the inside of the housing. The bonding of the cured material thus impedes moisture and contaminant flow through the lens-bezel junctions, and the junction between the housing and the lens and bezel.

The lens can have an emblem shaped recess, or recesses, in its rear side. The emblem can represent, for example, a trademark or tradename, or a decoration. Prior to assembly of the foregoing components, the part of the lens rear side surrounding the recesses is coated with a coloring material, such as paint. Thereafter, a layer of reflective-transmissive material is applied to the lens rear side and to the surfaces of the recesses. The characteristics and thickness of the reflective-transmissive material allow reflection of a substantial amount of light that strikes its front surface, and allows a significant amount of light from a light source located to its rear to be transmitted through it toward the front of the lens. When the viscous curable material is dispensed over a lens having such coatings and recesses, the viscous curable material overlays the layer of reflective-transmissive material, and fills the recesses. The curable material cures within the recesses. During daylight, light striking the front surface of the reflective-transmissive material is substantially reflected, while the other layer of color coating provides a contrasting color, so that a viewer can see the reflected emblem. However during nighttime, the reflective-transmissive material permits a significant amount of light emitted by the assembly light source to pass through it to the front side of the lens. The other contrasting layer of color coating is substantially opaque. As a result, an attractive lighted insignia is visible to a viewer looking at the lens front. The cured material within the insignia recesses provides a handsome visual effect to the light transmitted through it, and enhances the visual effect about the edges of the recesses by reducing visibility of the recess side walls.

The viscous curable material can have a diffusing agent mixed with it, such as through homogeneous suspension. Light from the assembly light source is thus diffused to present a softer emblem appearance. Light diffusion can also be provided by a reflective surface, such as a coating on the surface of the light source, that reflects light toward the interior surface of the housing, which light in turn is reflected to pass through the emblem recesses evenly to avoid a bright spot.

The invention can also be used with a lens having no substantially opaque coating. In that case, the lens can be shaped like an emblem, and the reflective-transmissive material can cover the rear of the lens. The light source, by illuminating the lens, thereby illuminates the emblem. During daylight, light reflected from the front surface of the reflective-transmissive layer, reflects the emblem appearance toward the viewer.

In a version of the invention which does not use a bezel, the lens and the housing are shaped to interfit with each other. For example, the lens can have a rearwardly extending rim which abuts the housing edge. The lens can have emblem forming recesses, and reflective-transmissive and colored coatings, as explained above. Viscous curable material dispensed upon the rear of the lens is contained within the lens rim. When the housing is pressed against the lens rear, the housing edge fits at least in part within the rim, with a junction formed between the lens and housing. The viscous curable material cures and bonds to impede moisture and contaminants from passing through the lens-housing junction. This embodiment lends itself to employment with an emblem shaped lens, in which case the lens rear can be coated with reflective-transmissive material, with no opaque material. The lens itself can be of curved or uneven shape as part of the emblem appearance. In such a case the rear lens surface may also be curved or sloped. If the rear lens surface is curved or sloped, or otherwise uneven, the viscous curable material can be dispensed through the housing opening for the light mount. With such an uneven rear lens surface, there may be multiple dispensing of the viscous curable material, if desired, and a tilting of the lens during dispensing so that the viscous curable material flows in sufficient amounts to desired areas on the rear surface of the lens. A sheet or layer of light diffusing material can be applied to the rear surface of the lens before the housing is mounted and before the viscous curable material has been dispensed. The use of such a layer of diffusing material, rather than mixing a diffusing agent with the viscous curable material, avoids unsightly variations in the amount of light passing from the front lens surface which could be caused by having variations in thickness along the rear of the lens of the viscous curable material with diffuser.

In another embodiment of the invention having no bezel, the lens can have a rear side with no rearward projections for containing viscous curable material. The lens can have insignia forming recesses and rear coatings as discussed above. Prior to dispensing the viscous curable material, a bead of sealer is dispensed on the lens rear side in proximity to the lens outer edge. The housing is then placed with its front edge near the outside of the sealer bead. The viscous curable material can then be dispensed through a housing opening, such as that for accommodating the light source. The dispensed viscous curable material covers the rear side of the lens. The viscous curable material rises to a level above the sealer bead to bond in association with the housing and the lens. When the curable material cures, a moisture and contaminant proof seal is formed between the housing and the lens.

An additional embodiment uses a lens having no rearward projections, with no housing or bezel. The lens can have emblem forming recesses and coatings as referenced above. A sealer bead is dispensed about the rear of the lens in proximity to its outer edge. Viscous curable material is dispensed within the sealer bead. A light source, such as a light emitting diode (L.E.D.), or an electro luminescent pad, is then placed against the rear of the viscous curable material and sealer bead. The viscous curable material when cured, bonds the pad thereto, and impedes the flow of moisture and contaminants to the lens coatings and to the front of the pad. The pad provides the rear lighting effect for the emblem.

The invention thus provides an automotive emblem lighting assembly and method that seals the junctions of the components to protect against contaminants, such as previously described, and moisture from entering the interior of the assembly to damage the light source, coatings and other components, while the sealing substance serves the additional function of providing an overall protective cover for the rear of the lens and the coatings, while further enhancing the visual effect of the emblem itself, and bonding the components together from a structural standpoint as well. The method of making the assembly is convenient, cost-effective, and provides for a sturdy product.

DESCRIPTION OF THE DRAWINGS

FIG. 5 is a section of the assembly of FIGS. 1–4, taken on the line 5—5 of FIG. 4, with the space between the outer edge of the lens and the inner edge of the bezel being slight exaggerated for purposes of better showing the junction formed between those two components;

FIG. 5A is an exploded and enlarged view of part of the lens, housing and the bezel taken within the area of the Line 5A—5A of FIG. 5;

FIG. 5B is an isolated, elevational view of a light source for the assembly;

FIG. 7 is a section view of another embodiment of an automotive emblem lighting assembly of the invention, wherein there is no bezel, and the lens has an outer rim that receives part of the housing;

FIG. 7A is an exploded and enlarged view of part of the assembly of FIG. 7, showing part of the lens and part of the housing edge, taken within the area of Line 7A—7A of FIG. 7;

FIG. 8 is a section view of yet another embodiment of the automotive emblem lighting assembly of the invention, wherein the assembly has no bezel; without the light source being shown;

FIG. 8A is an exploded and enlarged view of part of the lens and housing of FIG. 8, taken within the area of the Line 8A—8A of FIG. 8;

FIG. 9 is a section view of a further embodiment of the automotive emblem lighting assembly of the invention, featuring an assembly without a bezel or housing;

FIG. 9A is an exploded and enlarged view of part of the assembly of FIG. 9 showing part of the lens and part of the light pad, taken within the area of Line 9A—9A of FIG. 9;

FIG. 10 is a front view of still another embodiment of the automotive emblem lighting assembly of the invention, featuring an assembly without a bezel, and with the lens having the shape of an emblem trademark;

FIG. 11 is a top plan view of the assembly of FIG. 10;

FIG. 12 is an end view of the assembly of FIG. 10;

FIG. 13 is a rear view of the assembly of FIG. 10, without the light source;

FIG. 14 is a section taken on the line 14—14 of FIG. 10, which illustrates the uneven rear surface of the lens;

FIG. 15 is a section taken on the line 15—15 of FIG. 10;

FIG. 16 is an enlarged detail showing part of the assembly within the line 16—16 of FIG. 14; and FIG. 17 is an enlarged detail taken on the line 16—16 of FIG. 14 illustrating the location of the sealer bead.

DESCRIPTION OF PREFERRED EMBODIMENTS

General Description of a Preferred Embodiment

Figure 1:
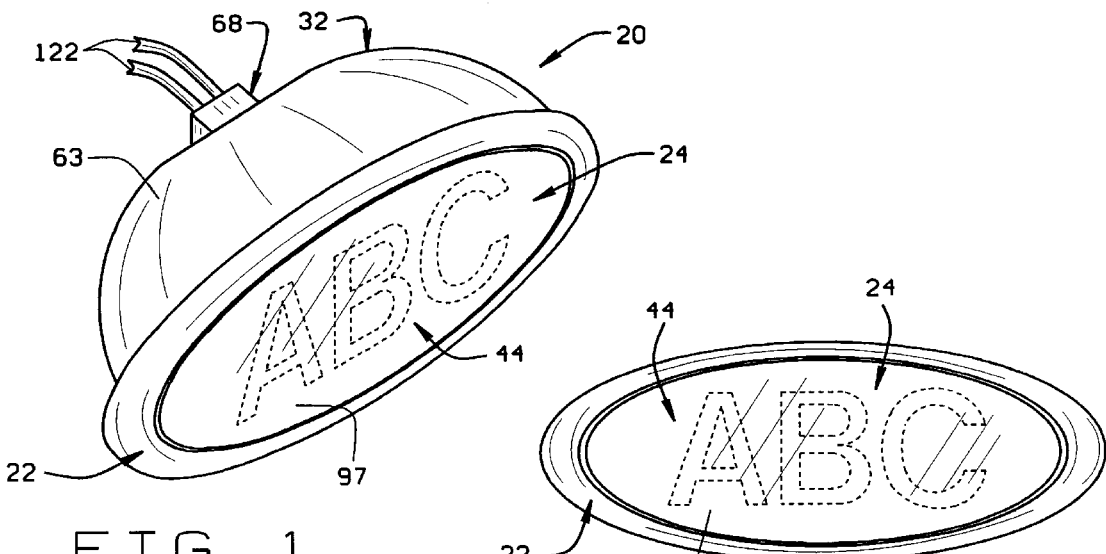
FIG. 1 is an isometric drawing of one embodiment of the automotive emblem lighting assembly, which embodiment has a bezel.
Figure 2:
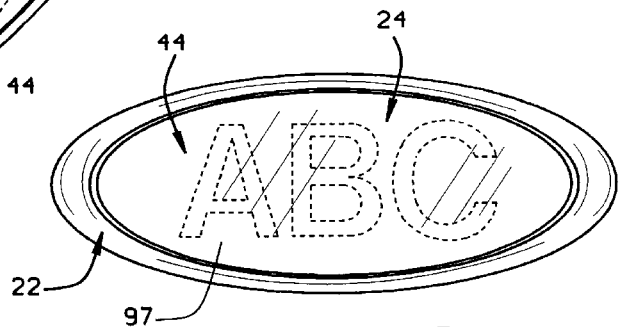
FIG. 2 is a front elevation of the assembly of FIG. 1.
Figure 3:
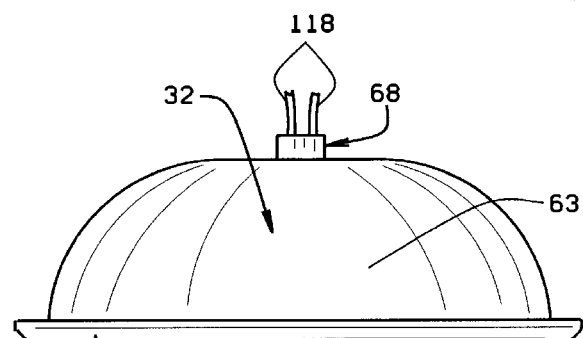
FIG. 3 is a top plan view of the assembly of FIG. 1.
Figure 4:
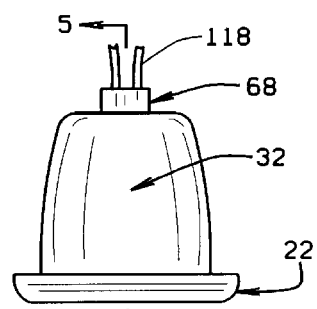
FIG. 4 is an end elevation of the assembly of FIG. 1.
Figure 6:
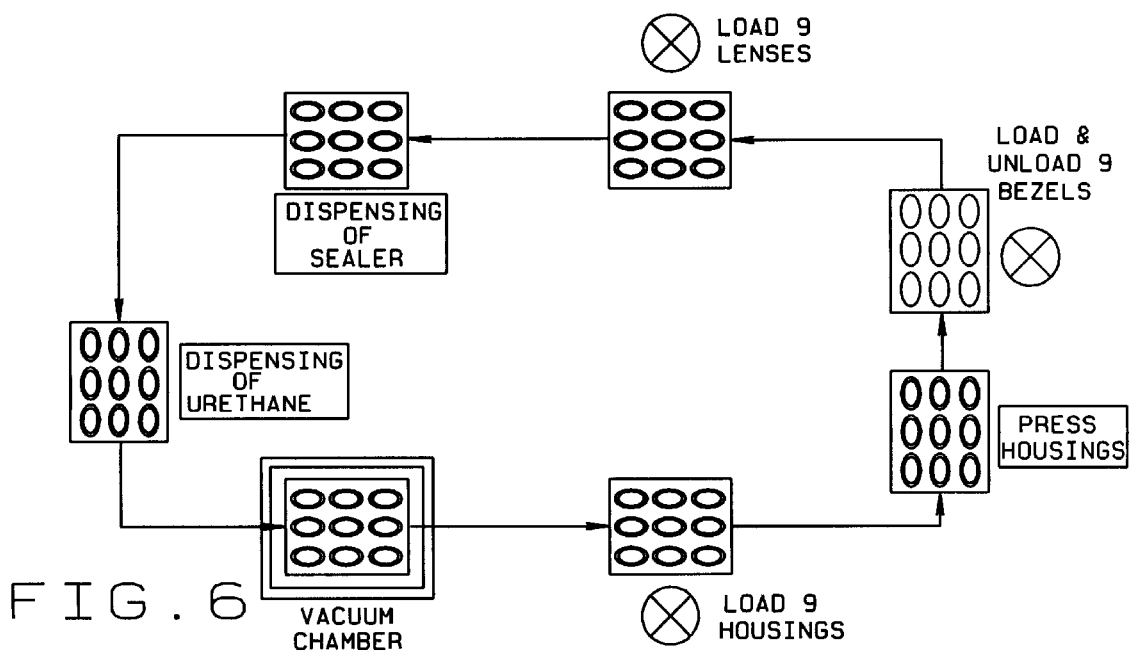
FIG. 6 is a schematic drawing illustrating a method of making an automotive emblem lighting assembly, such as the embodiment illustrated in FIGS. 1–5.

FIGS. 1 through 5 shows a first embodiment of a sealed automotive emblem mounting assembly 20. FIG. 6 shows a schematic diagram of a method of making a sealed automotive emblem mounting assembly 20. First, a general description of assembly 20 and method of making it are given. A more detailed description follows. The assembly 20 and method generally employ a bezel 22, a lens 24, a sealer 26, a viscous curable material 30, a housing 32 and a light source 34. Lens 24 can have a rear surface 40 with a plurality of recesses 41. Recesses 41 have front surfaces 42 and side surfaces 43. Recesses 41 form an emblem 44, such as, for example, the illustrated insignia "ABC", or a decorative figure.

A layer 46 of generally opaque material having color, such as paint, coats the lens rear surface 40 surrounding the recesses 41, but does not coat the recess surfaces 42 and 43. A layer 48 of reflective-transmissive material is applied to the rear of layer 46, and to the surfaces 42 and 43 of recesses 41. A junction 52 is formed at the interface of edges of lens 24 with bezel 22. A bead of sealer material 26 is dispensed over the rear of the junction 52.

The viscous curable material 30 is dispensed along the lens rear surface 40 to fill the lens recesses 41. The dispensed viscous curable material 30 extends above, and outwardly beyond, the sealer bead 26 to overlay part of the bezel interior surface 56. Sealer bead 26 prevents the viscous curable material 30 from seeping through junction 52 to the front of lens 24. Gas bubbles can be removed from the viscous curable material 30, as by placing the assembled components in a vacuum chamber.

Housing 32 has an oval shaped outer edge 60 of its curved wall 61. Wall 61 has an inner surface 62 and an outer surface 63. Housing 32 is first aligned so that its outer edge 60 is located above bezel surface 56 just to the outside of sealer bead 26. Housing 32 is then pressed so that edge 60 extends into the viscous curable material 30 just outside of the bead 26, to a position such as shown in FIG. 5. Some of the viscous curable material 30 remains between the housing edge 60 and the interior bezel surface 56, so that the curable material 30 bonds to housing edge 60 as well as to the lower parts of housing wall surfaces 62 and 63. The assembled components are then subjected to a temperature for sufficient time that allows the viscous curable material 30 to cure. With such curing, the viscous curable material 30 substantially hardens to firmly bond together the housing 32, bezel 22 and lens 24. A resulting seal is formed at the bezel-lens junction 52. The seal functions to block moisture in all forms, and contaminants, including salt, dirt, fiber, fuel vapor, antifreeze, hot waxes and cleaners, for example. These contaminants and other like contaminants, are referred to herein simply as "contaminants". The said seal at junction 52 thus blocks such contaminants and moisture flow through junction 52 to the inside of housing 32. The cured material 30 also forms a moisture and contaminant seal between the junction 64 of the housing wall edge 60, and the bezel 22 and lens 24, to impede the passage of moisture and such contaminants therebetween to the interior of housing 32. The light source 34, such as light bulb 66, is mounted to the rear of housing 32 in a fixture 68. Fixture 68, as known in the art, can be a flexible plastic material and shaped to fit snugly about the housing inner and outer surfaces 62 and 63, respectively, and rear housing opening, to make sealing of the unit complete.

The aforementioned sealing effect of cured material 30 protects the light source 34 and the coatings 46 and 48 from damaging effects of moisture and contaminants. The viscous material 30 can have a diffusive agent mixed with it, such as through homogeneous suspension. The cured material 30 with diffuser can thus diffuse light from light source 34. Diffusion can also be provided by a reflective coating 72 on light 66. During daylight, light striking the reflective-transmissive layer 48, which coats the emblem recesses 42, is substantially reflected so that the emblem 44 is distinctly visible.

At nighttime, the light from light source 34 is significantly transmitted through the reflective-transmissive layer 48 and blocked by layer 46, so that a lit emblem 44 can be viewed. The cured material 30 within lens recesses 41 affords a soft visual effect with backlighting, especially in reducing the visibility of the recess side surfaces 43. The diffusion of the light provided by the diffusing means enhances that softness.

The cured material 30 and the method of forming the assembly 20 thus have the combined benefits of providing moisture and contaminant tight seals at the junctions of the assembly components to protect the light source 34 and coatings 46 and 48, but also securely bonding the components together, while additionally giving a handsome visual effect through filling the emblem recesses 26 and diffusing light.

Detailed Description of Preferred Embodiments

Now, turning to an expanded and more detailed description of the embodiment of the assembly 20 shown in FIGS. 1–5, and its method as outlined schematically in FIG. 6, the bezel 22 can be of a plastic-like material such as, for example, ABS, i.e., co-polymers of acrylonitrile, butadiene and styrene; polycarbonate (PC); a combination of ABS-PC; or polyester. The material forming bezel 22 should be stable against ultraviolet radiation. Bezel 22 can be plated with chrome, painted or be unfinished plastic. With reference specifically to the exploded view of FIG. 5A, a more detailed structural description of bezel 22 is given. The bezel 22 has a curved outer surface 80. The bezel's inner edge is offset, with a distal longitudinal surface 84 which leads into a transverse stepped surface 86, that turns to a longitudinal surface 88. Surface 88 extends into curved interior surface 56 which, in turn, extends into a transverse outer end surface 89 having an outer edge 90.

The outer edge of lens 24 is shaped to compliment the inner edge of bezel 22. The lens outer edge has an outer longitudinal surface 91 which extends into a transverse stepped surface 92. Stepped surface 92 turns into a second longitudinal surface 96, which extends into the lens rear surface 40. Thus, when the lens 24 is placed to rest upon and be supported by bezel 22, the lens edge surfaces 91, 92 and 96 fig snugly against conforming bezel inner edge surfaces 84, 86 and 88 respectively, with the lens transverse outer edge surface 92 resting upon and supported by the transverse bezel surface 86. The space between the lens edge surfaces 90, 92 and 96 and bezel edge surfaces 84, 86 and 88 is exaggerated in FIG. 1 for illustrative purposes. The junction 52 is thus located between the lens edge surfaces 91, 92 and 96 and the corresponding bezel inner edge surfaces 84, 86 and 88 respectively. The rear of junction 52 is located at the point of the interior ends of lens edge surface 96 and bezel edge surface 88.

The lens front surface 97 is preferably smooth. The lens 24 should be stable to ultraviolet radiation. The lens 24 can be of acrylic plastic, polycarbonate, urethane, or Mylar, a Registered Trademark of Dupont, for example. The lens 24 can also be rigid or flexible. Lens 24 can be formed by molding or die-cutting, for example. The lens 24 is transparent or translucent, and can be color-tinted.

The first layer 46 of coating material can be a paint which is applied by roller coating, spraying, hot stamping, pad printing, or silk screening. Roller coating is generally preferred. Different colors can be used, but for illustrative purposes a medium blue color can be chosen. Layer 46 offers a visual contrast with the reflective-transmissive layer 48 for both reflected light or backlighting. Preferably layer 46 is opaque to offer greater contrast with layer 48, but layer 46 can be of a translucent material which offers a contrasting effect with layer 48.

The reflected-transmissive layer 48 can be of aluminum, zinc, tin, silver, indium, or nichrome, for example. Aluminum is generally preferred. An aluminum layer 48 can have a thickness of preferably from about 150 to about 300 angstroms (Å). The reflective-transmissive layer 48 can be vacuum metalized or sputter coated to give a high degree of reflectivity, such as about 100%, to light striking its front surface 100. Layer 48 allows a significant amount of light striking its back surface 102 to be transmitted through it, such as from about 25% to about 35% of the light, and preferably about 30% of the light. However, a greater amount of light transmission through layer 46 will also be effective.

The sealer bead 26 can be of material such as used for caulking. It can comprise silicone rubber, butyl rubber, urethane, or epoxy. It should have RTV (room temperature vulcanizing) characteristics, that is, it should be firm yet flexible with good bonding properties.

The viscous curable material 30 can comprise, but is ot limited to, peroxide/vinyl, eopxy/amine, epoxy/anhydride, epoxy/amide and isocyanate/hydroxy, often referred to as poured urethane because of its final chemical form. With regard to the curing of the viscous material 30, for illustrative purposes poured urethane can be used. The assembled components with the poured urethane can be placed in a temperature controlled zone preferably within a temperature range of about ambient temperature to about 180° F. (82° C.). More preferably the curing temperature is about 120° F. (49° C.). At 120° F. (49° C.) the urethane will have cured sufficiently in about four hours to allow the assembly 20 to be handled and moved without causing flow of the urethane. If, for example, the urethane is cured at a temperature of about 160° F. (71° C.), the urethane is sufficiently cured within about forty-five minutes to allow the assembly to be handled and moved without causing the urethane to flow. A wide range of temperatures with curing time periods that vary accordingly, can be used to produce a suitably cured material.

The diffusing agent suspended with the viscous curable material 30 can be a homogeneous suspension, which lends itself to an even distribution and diffusion of light and presents a cloudy or milky appearance. The diffusing agent can be a two part isocyanate or epoxy mix that produces a cloudy or milky appearance or a suitably dispersed pigment. The pigment can be white or colored depending on whether a white or colored diffuser is desired. For example the pigment can be titanium dioxide dispersed in a suitable polyester resin to give a white diffuser. Alternately a colored diffuser can be attained by the use of a suitable dye or transparent pigment dispersion coupled with a white pigment to give the diffusion characteristics. For example the combination of a titanium dioxide dispersion with a transparent iron oxide dispersion gives a reddish-orange diffusion layer.

For the diffusion arrangement provided by coating 72 on light bulb 66, the layer 72 can be symmetrically located with its outer edge 106 positioned so that the light from the bulb filament (not shown) cannot shine directly upon the cured material 30. Light striking the reflective layer 72 is reflected to the housing inner surface 62 from whence it is reflected toward cured material 30. This arrangement also reduces glare on unevenness of the light transmitted through reflective-transmissive layer 48. The layer 72, as well known in the art, can for example be a light blocking coating and can have reflective characteristics.

To provide the aforementioned snug fit of light fixture 68 against the housing 32, as is known in the art, the fixture 68 has an annular skirt 110 and tapered lugs 112 so that slots 114 are formed between the top lug surfaces 115 and the skirt bottom 116. The housing rear opening 118 is formed in a cross shape and sized to allow the four lugs 112 to pass through the cross arm openings. Once the fixture 68 is inserted so that the top lug surfaces 115 are within the housing, the fixture 68 can be rotated to position the lugs 112 underneath the housing inner surface 62. In this position, the skirt bottom 116 presses against the outer housing surface 63 about opening 118, while the top lug surfaces 115 are pressed against the housing interior surface 62 about the opening 118, to provide a snug seal of a fixture 68 about opening 118. A gasket can also be provided between the housing exterior surface 63 and skirt bottom 116. The fixture can have electrical wires 122.

The housing 32 can be of ABS, PC, or combined ABS-PC material. The housing material should be heat stable. The housing can be of a dark plastic so that light does not pass through its exterior surface 63. This composition will prevent undesirable backlighting of other automobile components, such as for example the grill supports or radiator when the assembly 20 is mounted on the grill of an automobile. The housing exterior surface 63 can also be painted or coated dark to prevent loss of light. The interior housing surface 62 can be coated with a reflective material so that more light is reflected from surface 62 through the lens 24.

Now a more detailed description is given of the FIG. 6 method of making the assembly 20. Generally, the movement of the components discussed in the method can be by means known in the art, such as through a conveyor. At the first station to the upper right corner of FIG. 1, a group of bezels 22, (nine such bezels 22 being shown for illustrative purposes), can be loaded onto a supporting structure such as a tray. The tray can then be conveyed to second station where nine lenses 24 are loaded onto each of the nine corresponding bezel 22 as heretofore described. Each of the outer lens edge surfaces 91, 92 and 96 thus fit snugly against surfaces 84, 86 and 88 of the inner edge of each bezel 22, as discussed earlier with reference to FIG. 5.

The nine groups of bezels 24 and lenses 22 are then conveyed to a third station where sealer is dispensed so that a sealer bead 26 covers the top of each lens-bezel junction 52, as heretofore described. Thereafter, the nine groups are conveyed to a fourth station where viscous curable material 30 such as urethane is dispensed as described earlier, over the rear of lens 24, bead 26 and interior surface 56 of bezel 22.

Thereafter, the groups of components are conveyed to a fifth station wherein the groups can be placed within a vacuum chamber which removes gas bubbles from the viscous curable material (urethane) 30. After that, the tray with the nine groups of components is conveyed to a sixth station wherein nine housings 32 are loaded into position upon the arrangement of bezel 22, lens 24, sealer bead 26, and viscous curable material 30, so that each housing edge 60 generally overlies a corresponding area of bezel inner surface 56 just to the outside of sealer bead 26 as previously described. Next, the tray is conveyed to a seventh pressing station, where the housings 32 are pressed toward the bezel 22 to the position shown in FIG. 5. After this, the groups are conveyed to an eighth station where the assemblies can be taken to a location for curing of the viscous material 30 (urethane). The curing can occur over the time and temperature ranges such as heretofore described. Generally, the higher the temperature, the shorter the time period for curing.

Following sufficient curing, a light source 34 can be mounted to each housing 32. The light source mounting can take place at the same plant or facility where the other components are assembled, or the assembled components thus far assembled can be shipped to a different location where the light source 32 can be mounted.

Other embodiments of the invention will now be described. The selection of which embodiment to use will depend upon the visual impression of the emblem desired. The alternative embodiment shown in FIGS. 7 and 7A is especially suitable for assemblies wherein the general configuration of the front of the lens is part of the design, and wherein the edge of the lens is not an ordinary or common shape. The alternative assembly 20' does not employ a bezel, but rather has a lens 24'. A rim 200 extends rearwardly completely about the outer edge of lens 24', so that a cavity 204 is formed within rim 200. Rim 200 has a rear edge 206, an inner surface 207, and an outer edge 208. Lens 24' can have a layer of coating material 46' and a reflective-transmissive layer 48' on its rear surface 40', with the reflective-transmissive layer 48' also covering the surfaces 42' and 43' of recesses 41'.

The housing 32' is similar in shape to housing 32, but its outer edge 60' is offset to provide a finger 210. Finger 210 has an outer surface 212 that continues into a transverse ledge 216, which then extends into housing outer surface 63'. Viscous curable material 30' is dispensed within cavity 204 to cover the rear lens surface 40' and fill lens recesses 41', as shown in FIG. 7, in the same fashion as heretofore described.

The method of assembling the FIG. 7 embodiment 20' is similar to that previously described in FIG. 6 for the FIGS. 1–5 embodiment, except that since there is no bezel, there is no step for loading bezels. There is also no step of dispensing sealer over a junction between a bezel and a lens. In the method of assembling, the group of lenses 20' are loaded on a support and conveyed to position for dispensing of viscous material 30' into cavity 204, as described. Then the lenses 24' are conveyed to a vacuum chamber for removal of gas bubbles from viscous curable material 30'. Thereafter, each housing 32' is positioned to be aligned so that the housing finger 210 is located, such as shown in FIG. 7A, to be just to the inside of rim 200, with housing ledge 216 above the inner part of rim edge 206. Each housing 32' is then moved toward the lens 24' so that finger outer surface 212 is against the rim inside surface 207, and transverse housing ledge 216 rests upon the inside part of rim edge 206, with the thin layers 46' and 48' therebetween.

Then the group of assemblies is positioned for curing, and cured as heretofore described. With embodiment 20' the lens surface 40' can also be modified further to be substantially flat, not have recesses 41', and further can eliminate the generally opaque or contrasting coating 46'. The reflective-transmissive coating 48' can then cover the entire rear surface of the lens. With such an arrangement, the light source 34' illuminates the entire lens when viewed from the front of the assembly. The housing 32' can be shaped to correspond to the shape of the lens, such as illustrated in the embodiment of FIGS. 10–17, to be described. In such an arrangement, the lens can be shaped like the desired emblem, such as the lens in the embodiment of FIGS. 10–17 is shaped.

In the modification shown in FIGS. 8 and 8A, the assembly 20" bears some similarity to the embodiment in FIG. 7 since the assembly 20" does not employ a bezel. In the FIG. 8 embodiment, the lens 24" has no rim such as the rim 200 in the FIG. 7 embodiment. Rather, the lens 20' has a flat rear surface 40", which extends to its outer edge. Lens 24" also has recesses 41". Lens 24" can have a layer of coating material 46" and a reflective-transmissive layer 48" on its rear surface 40", with layer 48" also covering surfaces 42" and 43" of recesses 41". A sealer bead 26" overlies the rear surface of reflective-transmissive layer 48" near the outer edge of lens 24". The housing 32" is similar in shape to housing 32.

The method of assembling the FIG. 8 embodiment 20" is similar to that described in FIG. 6 for FIGS. 1–5 of the embodiment, except that just with the method for the FIG. 7 embodiment, there is no step for loading bezels. The dispensing of the sealer 26" is hence not over a junction between a bezel and a lens, but rather about the perimeter of the lens 24" in promixity to the lens outer edge, such as shown in FIG. 8. The housing 32" is then placed with its front edge 60" near the outside of the sealer bead 26". The viscous curable material 30" is dispensed through the light housing source opening 118" so that the viscous curable material 30" covers the rear side of the lens 24" in the manner previously described, and overlays sealer 26" as well as contacting the housing inner surface 62" near housing edge 60". When the curable material 30 is cured, a moisture and contaminant proof seal is formed between the housing edge 60" and lens 24".

In the modification of FIGS. 9 and 9A, the assembly 20''', like the FIG. 8 embodiment, has no bezel and no rim about the lens edge. Assembly 20''' also has no housing 32. The lens 24''' has a flat rear surface 40''', which extends to its outer edge. Lens 24''' has recesses 41''', and can have a layer of coating material 46''' and a reflective-transmissive layer 48''' on its rear surface 40''', in the same fashion as described for lens 24" in the FIG. 8 embodiment. In the case of the FIG. 9 embodiment, the sealer bead 26''' is located on the exterior edge of the lens rear surface 40''' to overlie the reflective-transmissive layer 48'''. A cavity 204''' is formed within the sealer bead 26''' and the rear lens surface 40'''. A light source, illustrated as a electroluminescent pad 400 is positioned against the rear of the viscous curable material 30''' and sealer bead 26'''.

The method of assembling the FIG. 9 embodiment 20''' is similar to that previously described with some differences. As with the FIG. 7 and FIG. 8 embodiments, there is no step for loading bezels. The dispensing of the sealer bead 26''' is on the lens rear surface 40''' at the edge of lens 24''', as seen in FIG. 9. The viscous curable material 30''' is dispensed after the sealer bead 26''' is applied, so that the viscous curable material coating'" rises to a level approximately even with the top of the sealer bead 26'''. The electroluminescent pad 400 is then placed with its front surface 402 against the viscous curable material 30''' with the outer portion 404 of its front surface 402 resting upon sealer bead 26'''. When the viscous curable material cures, a moisture and contaminant proof seal is formed between the edge of the lens 24''' and the electroluminescent pad 400. A light emitting diode (L.E.D.) or other suitable light source can be substituted in place of the electroluminescent pad 400.

Turning to the embodiment of FIGS. 10–17, the assembly 20"" has the configuration of the well-known Chevrolet® emblem®. The lens 24"" has the configuration of that Chevrolet® emblem®, and has a rearwardly extending perimeter rim 200"". A cavity 204"" is formed within rim 200''''. Rim 200'' has a rear edge 206'''', an inner surface 207'''', and an outer edge 208'''' as seen more specifically in FIG. 16. In this case, lens 24'''' has no layer of opaque coating material, but does have a reflective-transmissive layer 48'''' on the lens rear surface 40''''. The lens 24'''' is sloped from its outer edges adjacent rim surface 207'''' towards its center, so that its front surface 97'''' slopes across its longer longitudinal dimension and also across its transverse shorter dimension as shown more specifically in FIGS. 11, 12, 14, and 15. This sloping creates a central valley on the lens inner surface 40''''.

The housing 32'''' has an outer edge arrangement similar to that for the FIG. 7 embodiment. The housing outer edge 60'''' has a finger 210'''' which in turn has an outer surface 212'''' that continues into a transverse ledge 216'''', which then extends into housing outer surface 63''''. Viscous curable material 30'''' is dispensed within the cavity 204'''' to cover the rear lens surface 40'''', as shown in FIGS. 14, 15 and 17. Housing 32'''' has two light source openings 118'''', for receiving two light sources 34'''', respectively. The two light sources 34'''' provide off centered light sourcing to better illuminate at the ends of the assembly 20'''', and more interior light, since the thickness of the material 30'''' is greater than in the other embodiments.

The method of assembling the FIG. 10–17 embodiment 20'''' is similar to that previously described for other embodiments, with some differences. There is no step for loading bezels, nor a step of dispensing sealer over a junction between a bezel and a lens. The group of lenses 20'''' are loaded upon individual mounts (not shown) each of which is sloped to conform to the slope of the lens outer surface 97''''. The mounts are in turn positioned on a support such as a tray and conveyed to a position so that each housing 32'''' is located to be aligned with the housing finger 210'''', such as shown in FIG. 16, to be just inside the rim 200'''' with housing ledge 216'''' above the inner part of rim edge 206''''. Each housing 32'''' is then moved toward the lens 24'''' so that the finger outer surface 212'''' is against the rim inside surface 204'''', and transverse housing ledge 216'''' rests upon the inside part of rim edge 206''''. Thereafter sealer 26'''' is applied to the lower part of housing exterior surface 63'''' and to the part of the lens rim edge 206'''' located to the outside of the housing surface 63'''' as shown more specifically in FIG. 17.

Then the tray of mounts with lens and housings are positioned for dispensing of viscous curable material 30'''' into each cavity 204''''. The viscous curable material 30'''' can be dispensed through each of the housing openings 118''''. As the curable material 30'''' is dispensed into cavity 204'''', it eventually rises to be above the part of rim edge 206'''' that is toward the center area of the longitudinal lens dimension, while being below the part of rim edge 206'''' that is at the far lens ends located to the far left and far right of FIG. 14. The dispensed curable material 30'''' ultimately rises so that the level of material 30'''' at the far ends of lens 24'''' at the far left and right of FIG. 14, is approximately even with housing ledge 216'''' of those ends. The sealer 26'''' helps to ensure that the viscous curable material 30'''' does not seep through the interface 520 between rim 206'''' and housing edge 60''''. The lenses 24'''' are then conveyed to a vacuum chamber for removal of gas bubbles from the viscous curable material 30''''. The tray supporting the group of lenses 24'''' and housing 32'''' are moved to a position where the viscous curable material 30'''' can be cured.

If desired, recesses could be formed in the lens 24'''' such as previously described, and opaque material 46'''' could be applied at desired parts of the lens rear surface.

Various other modifications apparent to those with ordinary skill in the art can be made to the aforementioned disclosure of preferred embodiments without departing from the spirit of the invention, which is limited only by the following claims.

What is claimed:

1. An automotive emblem lighting assembly, comprising:

(a) a bezel having an outer edge and an interior surface;

(b) a lens having a front surface, a rear surface, and an outer edge, the lens being mounted in association with the bezel with the lens outer edge within the outer edge of the bezel; and (c) a layer of viscous curable material having the characteristic of becoming harder during curing and the characteristic to seal against moisture and contaminants, said layer of viscous curable material substantially overlaying the rear side of the lens and extending beyond the outer edge of the lens to overlay part of the interior surface of the bezel;

(d) a housing, the housing having a wall with an outer edge and an interior surface, the housing having means for mounting a light source, the outer edge of the wall of the housing contacting the viscous curable material so that a sealing bond exists between the rear side of the lens, the interior surface of the bezel, and the outer edge of the housing, when the curable material cures.

2. An automotive emblem lighting assembly, comprising:

(a) a bezel having an outer edge, an interior surface, and an exterior surface;

(b) a lens having a front surface, a rear surface, and an outer edge; the lens being mounted in association with the bezel and within the outer edge of the bezel, with a junction formed between the outer edge of the lens and the bezel, the junction having a rear end;

(c) sealer material covering the part of the rear lens surface and bezel interior surface to cover the rear of the lens-bezel junction;

(d) a layer of curable material located along the rear side of the lens to substantially overlay the rear side of the lens, and extending beyond the outer edge of the lens to overlay part of the interior surface of the bezel, with the bezel interior surface and the rear side of the lens bonded to the curable material to seal off flow of moisture and contaminants through the said junction between the lens and the bezel from the front side of the lens to the rear side of the lens;

(e) a housing, the housing having a wall with an outer edge, the housing wall having an interior surface and an exterior surface, the outer edge of the wall contacting the curable material so that the curable material bonds to the housing wall to seal the housing wall to the bezel.

3. An automotive emblem lighting assembly, comprising:

(a) a lens having a front surface and a rear surface;

(b) a housing, the housing comprising a wall with an outer edge, the housing wall having an interior surface and an exterior surface;

(c) the outer edge of the housing wall and the lens having surfaces shaped to interfit with one another;

(d) a layer of curable material located along the rear side of the lens to substantially overlay the rear side of the lens and extend to the inner surface of the housing wall, so that the curable material can be bonded to the housing and in association with the rear side of the lens, to seal off the flow of moisture and contaminants between the outer edge of the housing wall and the lens.

4. The automotive emblem lighting assembly of claims 1, 2 or 3 wherein the assembly further comprises:

(a) a layer of coating material overlaying at least part of the rear surface of the lens, said layer of coating having a front surface which is visible when looking through the front side of the lens to provide a visual coloring effect; and (b) a layer of reflective-transmissive material overlaying at least part of the rear surface of the lens that is not covered by the said coating material, said reflective-transmissive layer having a front surface located to face toward the rear surface of the lens and a rear surface facing away from the rear surface of the lens, said layer of reflective-transmissive material having means for reflecting a substantial amount of light striking the front surface of the reflective-transmissive layer back to the front surface of the lens, and further having means for allowing light from a light source mounted behind its rear surface to be significantly transmitted through it toward the front surface of the lens.

5. The automotive lighting assembly of claim 4 wherein the layer of reflective-transmissive material allows about twenty-five percent to about thirty-five percent of the light from the light source that strikes the rear surface of the reflective-transmissive layer to pass through the reflective-transmissive layer.

6. The automotive emblem lighting assembly of claim 5, wherein the reflective transmissive layer reflects from about eighty-five to about one hundred percent of the light striking its front surface.

7. The automotive emblem lighting assembly of claim 4, wherein the lens has a recess in its rear surface, and wherein the recess has a surface that is coated by the layer of reflective-transmissive material, and wherein the layer of coating material does not cover the recess.

8. A method of making an automotive emblem lighting assembly, comprising:

(a) placing a bezel which has an outer edge and an interior surface on a support member;

(b) taking a lens having a rear surface and an outer part and placing the lens on the bezel so that the outer part of the lens is supported by the bezel within the outer edge of the bezel, with a junction formed between the outer part of the lens and the bezel;

(c) dispensing a sealer over the rear surface of the lens and the interior surface of the bezel so that the sealer covers the rear of the junction;

(d) dispensing a viscous curable material over the rear side of the lens, over the sealer and over part of the interior surface of the bezel, so that the layer of viscous curable material substantially overlays the rear surface of the lens, with the sealer acting to block flow of the viscous curable material through the junction;

(e) removing gas bubbles from the viscous curable material;

(f) placing a housing having a wall with a front edge, so that the front edge of the housing wall is moved into contact with the viscous curable material and is positioned within the outer edge of the bezel, and pressing the housing wall edge into the viscous curable material; and (g) then placing the combination of the bezel, lens, viscous curable material and housing for a selected period of time in a location having a temperature to allow curing of the curable material so that a moisture and contaminant proof sealing bond is formed between the lens, bezel and housing when the curable material cures.

9. The method of claim 8, further comprising the step of placing a light source within the housing.

10. An automotive emblem lighting assembly for use with a light source, comprising:

(a) a bezel having an outer edge, an interior surface, and an exterior surface;

(b) a lens having a front surface, a rear surface, and an outer edge, the lens having a recess in its rear surface, said recess having a back surface; the lens being mounted in association with the bezel and within the outer edge of the bezel, with a junction formed between the outer edge of the lens and the bezel, the junction having a rear end;

(c) a layer of substantially opaque coating material overlaying at least part of the rear surface of the lens but leaving uncovered at least part of the back surface of the lens recess, said layer of coating having a front surface which is visible when looking through the front side of the lens to provide a visual coloring effect;

(d) a layer of reflective-transmissive material overlaying at least part of the back surface of the lens recess that is not covered by the said coating material including overlaying at least part of the back surface of the recess which is not covered by the coating material, said reflective-transmissive layer having a front surface located to face toward the rear surface of the lens and a rear surface facing away from the rear surface of the lens, said layer of reflective-transmissive material having means for reflecting about eighty-five percent to about one hundred percent of light striking the front surface of the reflective-transmissive layer back to the front surface of the lens, and further having means for allowing about twenty-five percent to about thirty-five percent of the light from a light source mounted behind its rear surface to be transmitted through it toward the front surface of the lens;

(e) sealer material covering the part of the rear lens surface and bezel interior surface to cover the rear of the lens-bezel junction;

(f) a layer of curable material located along the rear side of the lens to substantially overlay the rear side of the lens, overlay the substantially opaque coating and reflective-transmissive coating, and fill the lens recess, said curable material extending beyond the outer edge of the lens to overlay part of the interior surface of the bezel, with the bezel interior surface and the rear side of the lens bonded to the curable material to seal off flow of moisture and contaminants through the said junction between the lens and the bezel from the front side of the lens to the rear side of the lens; and (g) a housing, the housing having a wall with an outer edge, the housing wall having an interior surface and an exterior surface, the outer edge of the wall contacting the curable material so that the curable material bonds to the housing wall to seal the housing wall to the bezel.

11. A method of making an automotive emblem lighting assembly, comprising:

(a) placing on a support member a lens which lens has a rear side, a rear surface and an outer part;

(b) dispensing a viscous curable material over the rear side of the lens, so that the layer of viscous curable material substantially overlays the rear surface of the lens;

(c) removing gas bubbles from the viscous curable material;

(d) placing a housing having a wall with a front edge, so that the front edge of the housing wall is moved into contact with the viscous curable material, and pressing the housing wall edge into the viscous curable material; and (e) then placing the combination of the lens, viscous curable material and housing for a selected period of time in a location having a temperature to allow curing of the curable material so that a moisture and contaminant proof sealing bond is formed between the lens, bezel and housing when the curable material cures; and (f) placing a light source within the housing.

12. An automotive emblem lighting assembly, comprising:

(a) a lens having a front surface and a rear surface;

(b) a housing, the housing comprising a wall with an outer edge, the housing wall having an interior surface and an exterior surface, the housing outer edge mounted adjacent the lens rear surface, with an interface between the housing edge and lens rear surface;

(c) sealer material positioned inside the housing at the interface of the lens rear surface and housing edge;

(d) a layer of curable material located along the rear side of the lens to substantially overlay the rear side of the lens and extend to the inner surface of the housing wall and overlay the sealer material, so that the curable material can be bonded to the housing and in association with the rear side of the lens, to seal off the flow of moisture and contaminants between the outer edge of the housing wall and the lens.

13. An automotive emblem lighting assembly, comprising:

(a) a lens having a front surface, a rear surface, and an outer edge;

(b) a light source located to the rear of the lens, the light source having a front surface and an outer edge;

(c) a layer of curable material located between the rear lens surface and the light source, the layer of curable material extending along the rear side of the lens to substantially overlay the rear side of the lens, so that the curable material can be bonded in association with the rear side of the lens and bonded with the front surface of the light source, to seal off the flow of moisture and contaminants between the outer edge of the lens and the outer edge of the light source.

14. The automotive emblem lighting assembly of claim 13 further comprising sealer material located on the lens rear surface at the outer edge of the lens, and on the front surface of the light source of the outer edge of the light source.

15. A method of making an automotive emblem lighting assembly, comprising:

(a) placing on a support member a lens which lens has a rear side, a rear surface and an outer edge;

(b) dispensing a viscous curable material over the rear side of the lens, so that the layer of viscous curable material substantially overlays the rear surface of the lens;

(c) removing gas bubbles from the viscous curable material;

(d) placing a light source having a front surface so that the light source front surface is moved into contact with the viscous curable material; and (e) then placing the combination of the lens, viscous curable material and light source for a selected period of time in a location having a temperature to allow curing of the curable material so that the light source front surface is bonded to the cured curable material and a moisture and contaminant proof sealing bond is formed between the lens and light source when the curable material cures.

16. The method of making an automobile emblem lighting assembly of claim 15, wherein after the step of placing the lens on the support member, and before the step of dispensing the viscous curable material, there is an additional step of applying a bead of sealer to the lens rear surface near the lens outer edge to form a cavity between the sealer and lens rear surface, and wherein in the dispensing step the viscous curable material is dispensed within the cavity.

* * * * *